United States Patent
Scholtes et al.

(10) Patent No.: US 9,264,387 B2
(45) Date of Patent: Feb. 16, 2016

(54) SYSTEM AND METHOD FOR AUTHORSHIP DISAMBIGUATION AND ALIAS RESOLUTION IN ELECTRONIC DATA

(71) Applicant: MSC INTELLECTUAL PROPERTIES B.V., Amsterdam (NL)

(72) Inventors: Johannes Cornelis Scholtes, Bussum (NL); Freek Peter Elisabeth Maes, Cadier en Keer (NL)

(73) Assignee: MSC INTELLECTUAL PROPERTIES B.V., Amsterdam (NL)

( * ) Notice: Subject to any disclaimer, the term of this patent is extended or adjusted under 35 U.S.C. 154(b) by 261 days.

(21) Appl. No.: 13/760,341

(22) Filed: Feb. 6, 2013

(65) Prior Publication Data

US 2014/0222928 A1    Aug. 7, 2014

(51) Int. Cl.
*H04L 12/58*     (2006.01)

(52) U.S. Cl.
CPC .............. *H04L 51/046* (2013.01); *H04L 51/28* (2013.01); *H04L 51/32* (2013.01)

(58) Field of Classification Search
CPC ..... G06Q 10/107; H04L 12/585; H04L 12/58
USPC ....................................................... 709/206
See application file for complete search history.

(56) References Cited

U.S. PATENT DOCUMENTS

| | | | |
|---|---|---|---|
| 7,627,562 B2 | 12/2009 | Kacmarcik et al. | |
| 7,849,399 B2 | 12/2010 | Hoffmann | |
| 7,970,766 B1 | 6/2011 | Shamsi et al. | |
| 8,078,573 B2 | 12/2011 | Betz | |
| 8,082,248 B2 | 12/2011 | Abouyounes | |
| 8,122,026 B1 | 2/2012 | Laroco, Jr. et al. | |
| 2013/0173604 A1* | 7/2013 | Li | G06F 17/30864 707/723 |

OTHER PUBLICATIONS

Johan Dahlin et al., Comining Entity Matching Techniques for Detecting Extremist Behavior on Discussion Boards, Aug. 2012, IEEE/ACM International Conference on Advances in Social Networks Analysis and Mining, pp. 850-857.*

(Continued)

*Primary Examiner* — Nicholas Taylor
*Assistant Examiner* — Chong G Kim
(74) *Attorney, Agent, or Firm* — Carlos R. Villamar; The Villamar Firm PLLC

(57) ABSTRACT

A system, method and computer program product for authorship determination, and alias resolution, including a document collection; a Jaro-Winkler similarity module configured for performing authorship determination and alias resolution based on at least one of email addresses, user identification numbers (IDs) on social networks, names written in text, and proper names, including countries and cities in the document collection; an authorship Support Vector Machine (SVM) module configured for performing authorship determination and alias resolution based on content of documents in the document collection, including at least one of emails, and social networks information; and a Jaccard similarity module configured for performing authorship determination and alias resolution based on link networks in the document collection. One or more of the Jaro-Winkler similarity module, the authorship Support Vector Machine (SVM) module, and the Jaccard similarity module are employed for performing the authorship determination and the alias resolution in the document collection.

3 Claims, 18 Drawing Sheets

(56) References Cited

OTHER PUBLICATIONS

Danushka Bollegala et al., Automatic Discovery of Personal Name Aliases from the Web, Sep. 2010, IEEE Transactions on Knowledge and Data Engineering, vol. 23, No. 6, pp. 831-844.*

André Nunes et al., Using supervised machine learning methods to resolve user identities on the social Web, 2009.*

Anshu Malhotra et al., Studying user footprints in different online social networks, Aug. 2012, IEEE/ACM International Conference on Advances in Social Networks Analysis and Mining, pp. 1065-1070.*

Waske et al., "Fusion of support vector machines for classification of multisensor data," Geoscience and Remote Sensing, IEEE Transactions, 2007, pp. 3858-3866.*

Malakasiotis et al., "Learning textual entailment using SVMs and string similarity measures," Proceedings of the ACL-PASCAL Workshop on Textual Entailment and Paraphrasing, Association for Computational Linguistics, 2007.*

Faria et al. "A framework for selection and fusion of pattern classifiers in multimedia recognition," Pattern Recognition Letters, 2014, pp. 52-64.*

Manning, C. D., et al. (2009). An Introduction to Information Retrieval. No. c. Cambridge University Press, Cambridge, England, 2009 edition.

Scholtes, J.C. (1993). Neural Networks in Natural Language Processing and Information Retrieval. Ph.D. Thesis, Jan. 1993, University of Amsterdam, Department of Computational Linguistics, Amsterdam, The Netherlands.

Scholtes, J.C. (1995). Neural Networks in Information Retrieval in a Libraries Context. Final report, Prolib/Ann, DG XIII, European Commission, Luxembourgh.

Hsu, Chih-Wei, et al. A Practical Guide to Support Vector Classication, Department of Computer Science, National Taiwan University, Taipei 106, Taiwan, Initial version: 2003 Last updated: Apr. 15, 2010.

Maes, Freek, et al. (2012). Authorship Disambiguation and Alias Resolution in Email Data. Benelux Artificial Intelligence Conference (BNAIC), 2012. Maastricht, the Netherlands, Oct. 25-26, 2012.

* cited by examiner

The *Jaro similarity* algorithm uses the number of transpositions $T$ and the number of matching characters $m$ in order to determine the similarity between two strings. Two characters are matching only if they are no farther apart than half the length of the longest string. The number of transpositions is defined as the number of matching characters in different sequence orders divided by two. The similarity is then calculated as follows:

$$Jaro(s,t) = \frac{1}{3}\left(\frac{m}{|s|} + \frac{m}{|t|} + \frac{m-T}{m}\right) \quad \text{---} \quad 401$$

where $|s|$ denotes the length of string $s$.

The *Jaro-Winkler similarity* [07] is an extension of the Jaro-algorithm using the empirical finding by Winkler that less errors tend to occur at the start of strings. The similarity is calculated as follows, where $p$ is the length of the prefix that the two strings share:

$$Jaro\text{-}Winkler(s,t) = Jaro(s,t) + \frac{p}{10}(1.0 - Jaro(s,t)) \quad \text{---} \quad 402$$

*Jaccard similarity* is another link analysis metric that can be used to determine the similarity between the neighborhoods of two vertices. The similarity between the neighborhoods of $v_i$ and $v_j$ is defined as follows:

$$Jaccard(v_i, v_j) = \frac{|N(v_i) \cap N(v_j)|}{|N(v_i) \cup N(v_j)|}$$

where $N(v_i)$ again designates the set of neighbors of $v_i$.

Example of Extracted Text Features for Authorship SVM

| | Features | Description |
|---|---|---|
| Lexical | | |
| | 1 Total number of characters (C) | |
| | 2 Total number of alphabetic characters / C | |
| | 3 Total number of upper-case characters / C | |
| | 4 Total number of digit characters / C | |
| | 5 Total number of white-space characters / C | |
| | 6 Total number of tab spaces / C | |
| | 7-32 Frequency of letters | A-Z |
| | 33-52 Frequency of special characters | ~@#$%^&*-_=+><[]{}/\ |
| | 53 Total number of words (M) | |
| | 54 Total number of short words / M | less than four characters |
| | 55 Total number of characters in words / C | |
| | 56 Average word length | |
| | 57 Average sentence length (in characters) | |
| | 58 Average sentence length (in words) | |
| | 59 Total different words / M | |
| | 60 Hapax legomena | Frequency of once-occurring words |
| | 61 Hapax dislegomena | Frequency of twice-occurring words |
| | 62 Yule's K | vocabulary richness-measure |
| | 63 Sichel's S | vocabulary richness-measure |
| | 64 Brunet's W | vocabulary richness-measure |
| | 65 Honore's R | vocabulary richness-measure |
| | 66 Word length frequency distribution / M | |
| | 67-86 TF*IDF of 250 most frequent 3-grams | |
| Syntactic | | |
| | 87-237 Frequency of punctuation | .,?!:;"' |
| | 238-345 Frequency of function words | |
| Structural | | |
| | 346-495 | |
| | 496 Total number of sentences | |

List of function words used in authorship SVM

| a | both | inside | off | such | what |
|---|---|---|---|---|---|
| about | but | into | on | than | whatever |
| above | by | is | once | that | when |
| after | can | it | one | the | where |
| all | cos | its | onto | their | whether |
| although | do | latter | opposite | them | which |
| am | down | less | or | these | while |
| among | each | like | our | they | who |
| an | either | little | outside | this | whoever |
| and | enough | lots | over | those | whom |
| another | every | many | own | though | whose |
| any | everybody | me | past | through | will |
| anybody | everyone | more | per | till | with |
| anyone | everything | most | plenty | to | within |
| anything | few | much | plus | toward | without |
| are | following | must | regarding | towards | worth |
| around | for | my | same | under | would |
| as | from | near | several | unless | yes |
| at | have | need | she | unlike | you |
| be | he | neither | should | until | your |
| because | her | no | since | up | |
| before | him | nobody | so | upon | |
| behind | i | none | some | us | |
| below | if | nor | somebody | used | |
| beside | in | nothing | someone | via | |
| between | including | of | something | we | |

FIG. 10    Training Authorship SVM

FIG. 12   Training Voting SVM

FIG. 15 Testing Authorship and Voting SVM

FIG. 16 — Classifying with Authorship and Training Voting SVM

SYSTEM AND METHOD FOR AUTHORSHIP DISAMBIGUATION AND ALIAS RESOLUTION IN ELECTRONIC DATA

BACKGROUND OF THE INVENTION

1. Field of the Invention

The present invention generally relates to systems and methods for processing large amounts of data, and more particularly to systems and methods for authorship determination, alias resolution, and the like.

2. Discussion of the Background

In recent years, systems and methods for processing large amounts of data have been developed. However, such systems lack robustness with respect to authorship determination, alias resolution, and the like.

SUMMARY OF THE INVENTION

Therefore, there is a need for a method and system that addresses the above and other problems with systems and methods for processing large amounts of data. The above and other problems are addressed by the illustrative embodiments of the present invention, which provide improved systems and methods systems for processing large amounts of data, including authorship determination, alias resolution, and the like, by employing improved string similarity metrics, techniques, and the like, from authorship attribution, link analysis, and the like, and combining such individual methods into an improved method employing the strength of each individual method.

Accordingly, in illustrative aspects of the present invention there is provided a system, method, and computer program product for authorship determination, and alias resolution, including a document collection; a Jaro-Winkler similarity module that can be configured for performing authorship determination and alias resolution based on at least one of email addresses, user identification numbers (IDs) on social networks, names written in text, and proper names, including countries and cities in the document collection; an authorship Support Vector Machine (SVM) module that can be configured for performing authorship determination and alias resolution based on content of documents in the document collection, including at least one of emails, and social networks information; and a Jaccard similarity module that can be configured for performing authorship determination and alias resolution based on link networks in the document collection. One or more of the Jaro-Winkler similarity module, the authorship Support Vector Machine (SVM) module, and the Jaccard similarity module can be employed for performing the authorship determination and the alias resolution in the document collection.

The system, method, and computer program can include a voting module that can be configured to combine outputs from one or more of the Jaro-Winkler similarity module, the authorship Support Vector Machine (SVM) module, and the Jaccard similarity module using a voting algorithm.

The system, method, and computer program can be configured to extract syntactic, structural, and semantic features for the authorship determination and the alias resolution in the document collection.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 4 illustrates an exemplary mathematical description of a Jaro-Winkler method;

FIG. 6 illustrates an exemplary table with extracted syntactic, semantic and structural features of a text of a document for an authorship support vector machine (SVM);

FIG. 7 illustrates an exemplary table of function words used in an authorship support vector machine (SVM);

DETAILED DESCRIPTION OF THE PREFERRED EMBODIMENTS

Figure 1:
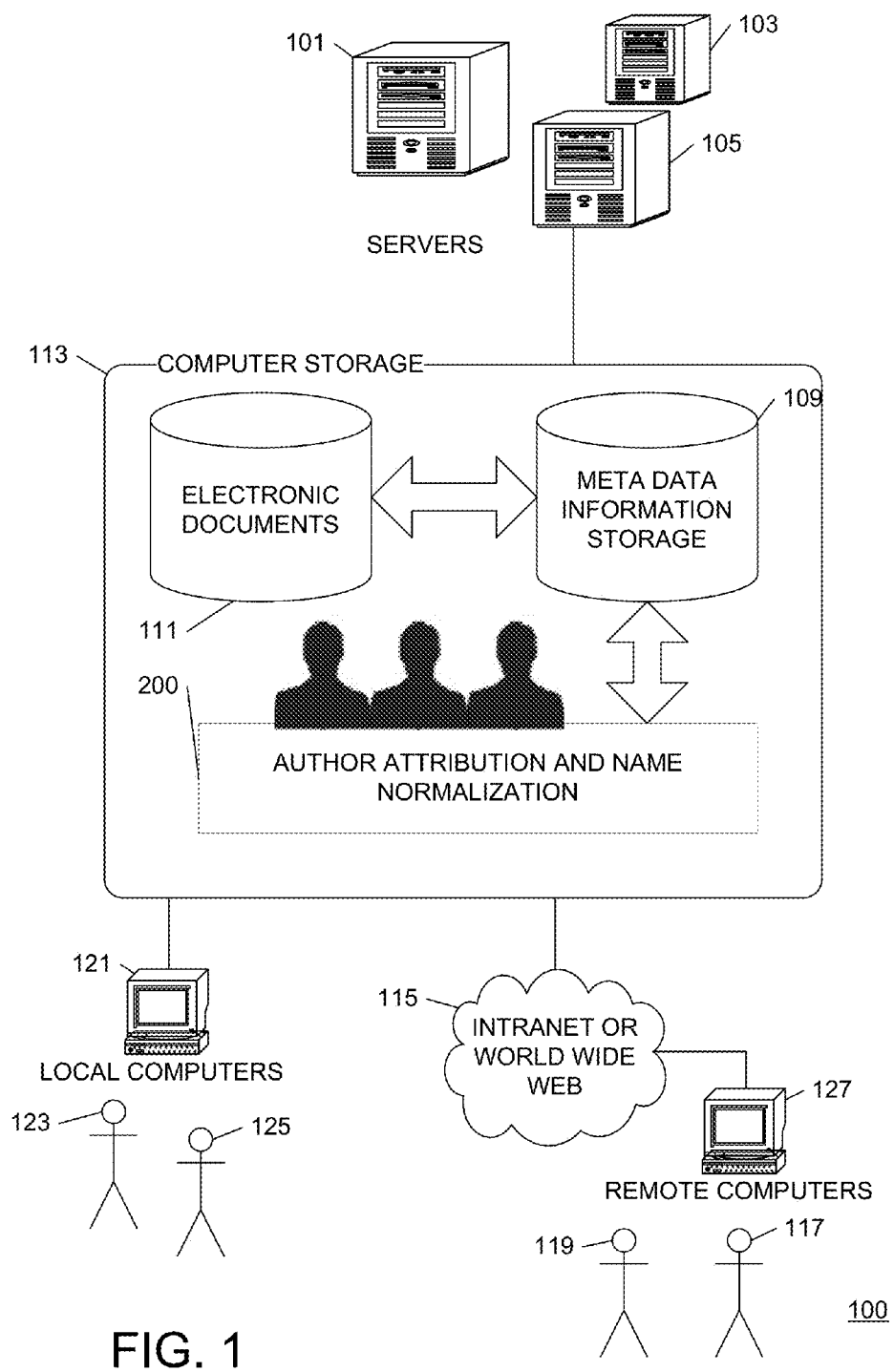
FIG. 1 illustrates an exemplary system for authorship disambiguation and alias resolving.

The present invention includes recognition that authorship disambiguation and alias resolution are increasingly important concepts in various domains, such as e-Discovery, Legacy Data Clean-up, Intelligence and Law, and the like, and in particular, for any types of electronic data collection, such as, for example, various electronic documents, but also email, social networks, chatting and other cloud-based data collections and communication which may contain authors that use one or more aliases, and the like. Aliases occur when a person uses multiple electronic identities, such as email addresses, user names or other social-media and cloud identifiers, and the like, intentionally or unintentionally, and the like. For example, people can try to hide their identity by intentionally adopting several different email addresses, something that is common in intelligence data-sets, such as terrorist networks, and the like. On the other hand, the use of different email addresses (e.g., home, office, etc.) is becoming common nowadays. Hence, there also exist many unintentional aliases, for example, where only the domain of the email address is different, or where a simple misspelling of a name, and the like, has occurred.

Examples of such name variations can include email variations, such as john.doe@amce.com, jdoe@amce.com, or jdoe@gmail.com, but also can include so-called "nice names" in email headers, such as "John Doe", "Mr. Doe" and "Mr. J. Doe." More complex variations can include "Barack Obama" and "President" or "President of the United States," as they change over time. Deliberate aliases are names without any suitable logical relation. For example, "John White" using the name "Peter Jones" with another group of people or an author writing a new book under a completely different name, and the like.

Multiple references to the same individuals or entities, cause confusion and ambiguity when data is analyzed in mathematical, statistical, visualization, and the like, tools. For example, instead of having only one occurrences of a name, there may be multiple occurrences, resulting in missed and wrong statistics, connections, links, and the like, and which can result in data sets that can be up to 10 times larger than normalized data sets. Because many of the analytics are computationally very intensive (e.g., both in memory and CPU need) and typically with a computational complexity that is quadratic, polynomial or exponential with respect to the number of unique items that are analyzed, it is advantageous to reduce the number of unique items to reduce calculation times, memory usage, and the like.

Accordingly, name normalization, and the like, can be advantageous for reducing the number of unique entities, and the like, and various approaches have been applied to resolve aliases in electronic data sets, each with its own shortcomings. For example, unintentional aliases can be resolved by employing metrics that indicate how much two identifiers look alike. In one approach, authorship attribution can be based on name, user name, or email address similarity by calculating a text string similarity between each author-candidate pair based on email addresses, and the like. The most used text string distance can be determined using the Edit or Levinstein distance, and the like, which can calculate the similarity between two strings, based on the number of matching characters, the number of transpositions needed to transform one string into the other, and the like. However, such metrics are easily fooled by persons using completely different identifiers.

Another approach focuses on the content of any suitable kind of electronic information, for example, such as an email message, a social media write up, and the like, by creating a mathematical fingerprint of an author's writing style, and the like. By comparing the writing style of different authors, and finding those that employ similar writing styles, aliases that are more complex can be detected. In addition, authorship can be based on content by calculating a combination of text features, and the like, such as word and character frequencies, and the like. By employing machine learning, for each author, a classifier can be created. However, this approach may encounter scalability issues, for example, when the number of authors grows large, the length of the texts grows small, and the like, and as is often the case in electronic data sets.

Another approach makes use of the fact that even if an author uses a completely different identifier and writing style, the people with whom the author corresponds or contacts via electronic means, and the like, might remain stable. The similarity between different identifiers of contacts of authors can be determined using link analysis techniques, and the like. One also can determine authorship based on such link analysis techniques, for example, including a Connected Path (CP) technique, and the like. For example, by aggregating all suitable possible paths between two authors in an intelligent way, such algorithms can derive a similarity metric that indicates the similarity of link networks, and the like, of the two authors, and the like. However, none of the current methods are completely suitable for determining authorship, and the like, accurately. Accordingly, there is a need for better individual methods for determining authorship, and the like.

Generally, the systems and methods of the illustrative embodiments can determine authorship, for example, based on email address similarity by calculating a combined Jaro-Winkler similarity between each author-candidate pair, for example, based on real names, user names, email addresses, and the like, used by authors. The Jaro distance can calculate the similarity between two strings, for example, based on the number of matching characters, the number of transpositions needed to transform one string into the other, and the like. The Winkler-enhancement increases the Jaro-score, for example, when the two strings share a common prefix, and the like, and which can be referred to as "Jaro-Winkler" or "JW."

The systems and methods of the illustrative embodiments also can determine authorship based on content, for example, by taking into account a combination of lexical, syntactic, structural, and the like, features that can be extracted. Examples of such features can include word and character frequencies, frequency of punctuation, vocabulary richness measures, 3-grams, sentence length and frequency of function words, and the like. For each author, a Support Vector Machine (SVM) can be created using an email of an author as a positive training example, and a random selection of other emails as negative training examples. Both classes can be balanced in the number of training instances. This approach can be referred to as "authorship SVM."

The systems and methods of the illustrative embodiments also can determine authorship based on link-analysis, for example, by employing the Jaccard analysis methods, and the like, to detect aliases in the link network.

Since the above approaches operate on different domains, including the actual user identifier, the content of electronic data, the structure of the network of all suitable identifiers of users, and the like, the systems and methods of the illustrative embodiments also can combine such approaches and utilize the combined strengths, advantageously, and the like, to overcome individual weaknesses of each approach, resulting in increased performance, and the like, as compared to the individual techniques, and the like.

In an illustrative embodiment, such combining can employ an SVM voting algorithm, and the like, which can be referred to as "Voting SVM." Since the SVM automatically assigns weights to different combinations of results, such an approach can distinguish between successful and unsuccessful combinations of results, and the like. For example, if the results of one of the technique are ambiguous, another of the techniques can possibly aid in making the classification decision, and the like. Accordingly, the combination of such techniques can outperform the use of each technique separately.

Advantageously, the above-described techniques can resolve various types of aliases and unintentional misspellings or variations in naming conventions, and the like. For example, the Jaro-Winkler similarity technique can be employed on email addresses, user identification (IDs) on social networks, and the like, names written in text, and other proper names, such as countries, cities, and the like, the authorship SVM technique can be employed on email content, and the like, for author disambiguation, alias resolution, and the like, and the Jaccard similarity technique can be employed on link networks, and the like, for author disambiguation, alias resolution, and the like. Advantageously, with a suitable training text, and the like, such approach can be used to accurately predict a real author of a given set of documents, even when dealing with a large author data set, and the like.

Advantageously, such a combination of the above-describe techniques can increase precision, recall, and the like, as compared to employing each technique individually. Accordingly, a combination of Jaro-Winkler similarity on email addresses, authorship SVM on email content, and Jaccard similarity of a link network using an SVM voting algorithm can achieve superior results, provide robustness across different decision thresholds, which is useful when determining a proper threshold proves to be difficult. Such an approach can be especially helpful on a data set having aliases that are difficult to recognize, and the like, wherein the combination of techniques provides superior performance, including significantly higher precision and recall scores, and the like, than the individual techniques used alone, indicating that the different techniques are indeed complementary and can work together to achieve improved results, and the like.

In summary, the combination of the described techniques can operate on different domains, and is more effective in disambiguating authors and resolving aliases than each of the techniques used individually. In addition, such an approach not only can find similar occurrences of names, user identification, email addresses, and the like, but can also dramatically reduce the size of the data sets, and the like, often by a factor of ten, and providing a linear positive impact on calculation time, memory requirements, and the like, in advanced data analytics, visualization, and the like.

Referring now to the drawings, wherein like reference numerals designate identical or corresponding parts throughout the several views, and more particularly to FIG. 1 thereof, there is illustrated an exemplary system for authorship disambiguation and alias resolving, and the like. In FIG. 1, generally, the authorship disambiguation and alias resolving system 100 provides authorship disambiguation and alias resolution by using Jaro-Winkler similarity on email addresses, and the like, authorship SVM on email content, and the like, and/or Jaccard similarity of a link network, and the like, to predict a real author of a given set of documents, and the like. The combination of the individual techniques also can be employed to increase precision, recall, and the like, when compared with individual techniques used alone. The system can include, for example, a document storage device 113 (e.g., a computer storage device, etc.) including one or more document collections 111, one or more document meta data information storage devices 109 (e.g., a computer storage device, etc.), and one or more name, authorship and alias resolution devices 200, for example, accessed through one or more servers 101, 103 and 105. The system 100 can be used for automatic extraction of structural, semantic, and syntactic information, and the like, from relevant training models, training of a machine learning model for authorship detection, and for using the derived machine learning model for automatic name, authorship, alias resolution, and the like, by employing one or more of the individual name, authorship and alias resolution methods or by a combining them in one method, for example, using a voting algorithm.

One or more local computers 121 can provide connectivity to one or more users 123 and 125, for example, via a local-area network (LAN), and the like. Similarly, one or more remote computers 127 can provide connectivity to one or more remote users 117 and 119, for example, via the Internet, an Intranet, a wide-area network (WAN) 115, and the like. Accordingly, the computers 121 and 127 connect to the document storage device 113 allowing the one or more users 123, 125, 119 and 117 to manually or automatically access the document collection 111, and view documents, document groups, document meta information, training documents, training results, the machine learning model, document classifications, names, authorships, aliases, and the like.

Figure 2:
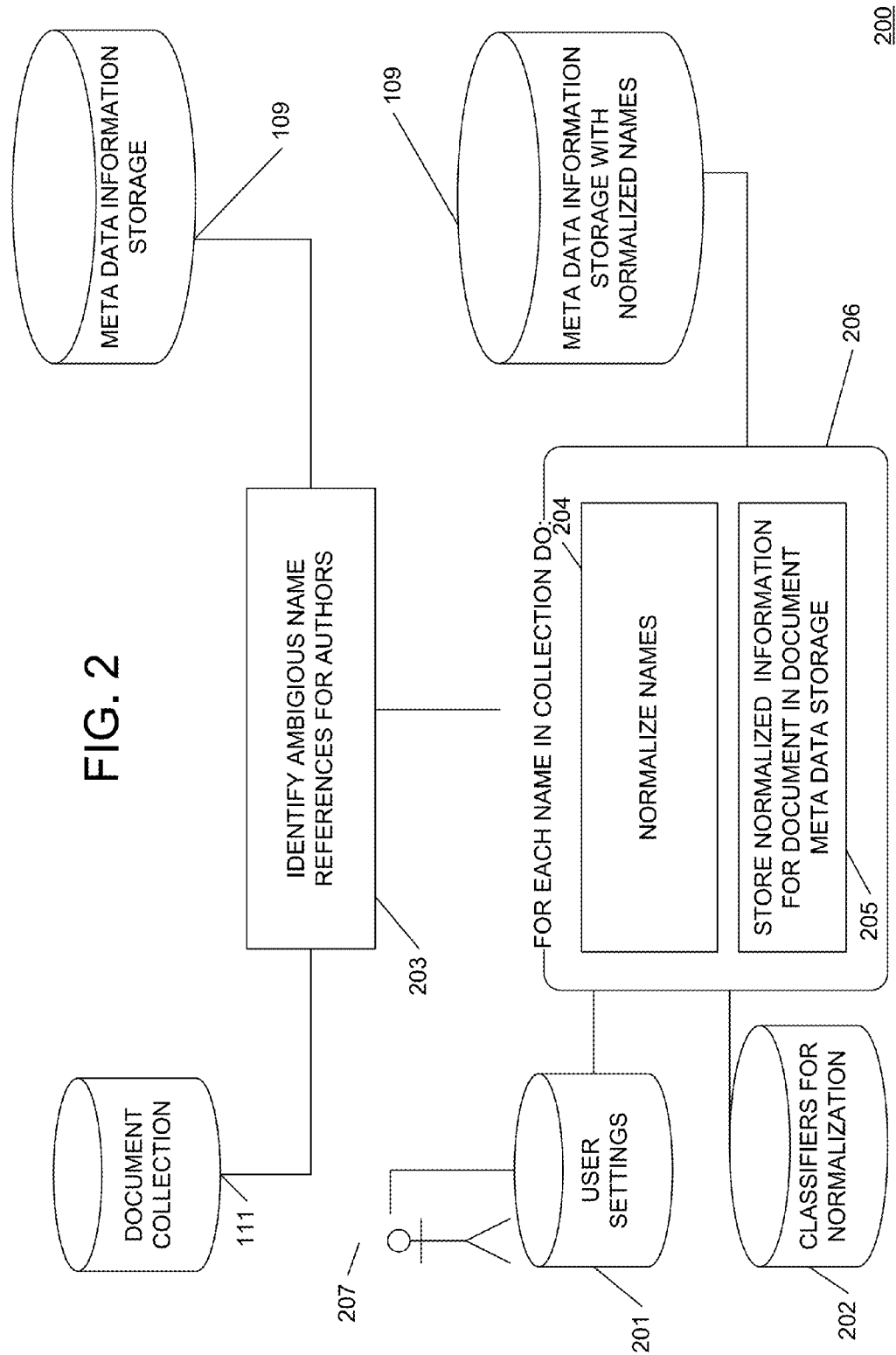
FIG. 2 illustrates an exemplary process to identify name references and aliases, wherein each of the references or aliases are automatically normalized or resolved to a real author or name, and such values are stored in a meta data repository.

The servers 101, 103 and 105 communicate with the computer storage device 113 to extract meta data information 109 for each document in the document collection 111, to create unique document identifiers for each document, to label the document meta data 109 with the document identifiers of the document groups, to create a name, authorship and alias resolution system and method 200, as shown in FIG. 2, and to automatically train the name, authorship and alias resolution system 200, and to use the authorship and alias resolution system 200 for authorship and alias resolution (e.g., on documents not used for training the machine learning model), to test the quality of the for authorship and alias resolution system 200 with pre-labeled test documents from the document collection 111, and the like.

As described above, the users 123, 125, 119 and 117 can access the document collection 111 by using the computers 121 and 127 connected over a LAN or the Internet or Intranet 115. When a document is found, the system can display the content of the documents 111, the meta information of the documents in the meta information storage device 109, the training documents (e.g., a selection from the document collection 111) for authorship and alias resolution 200, and the labels of the automatically categorized documents from the document collection 111 in the meta data storage device 109.

FIG. 2 illustrates an exemplary process to identify name references and aliases, wherein each of the references or aliases are automatically normalized or resolved to a real author or name. In FIG. 2, each of such references or aliases are automatically normalized or resolved to the real author or name, and stored in the meta data repository 109. Accordingly, at step 203, for each document from the document collection 111, a record in the meta information storage device 109 is created and stored. At step 203, for each document in the document collection 111, a unique document identifier (ID), for example, such as a unique serial number, a MD-5, SHA-1, SHA-2, SHA-128 hash value, and the like, are created. The unique identifier is stored in a record in the meta data information storage device 109 that belongs to the corresponding document in the document collection database 111. In addition, step 203 identifies all suitable name and author references that occur in a document and stores them in the unique record that exists for each document.

At step 206, for each document in the document collection 111, name, authorship and alias resolution is automatically performed using one or more of the individual name, authorship and alias resolution methods (e.g., Jaro-Winkler, Jaccard Similarity and Authorship SVM) or combining the techniques in one method using a voting algorithm, and the like, in step 204. In step 205, the extracted information is stored in a record in the meta data information storage device 109 that belongs to the corresponding document in the document collection database 111. A user 207 can store preferences for normalization and alias resolution in the user settings storage device 201. Settings and machine learning models used by the Jaro-Winkler, Jaccard Similarity, Authorship SVM and Voting SVM are stored in data storage device 202.

Figure 3:
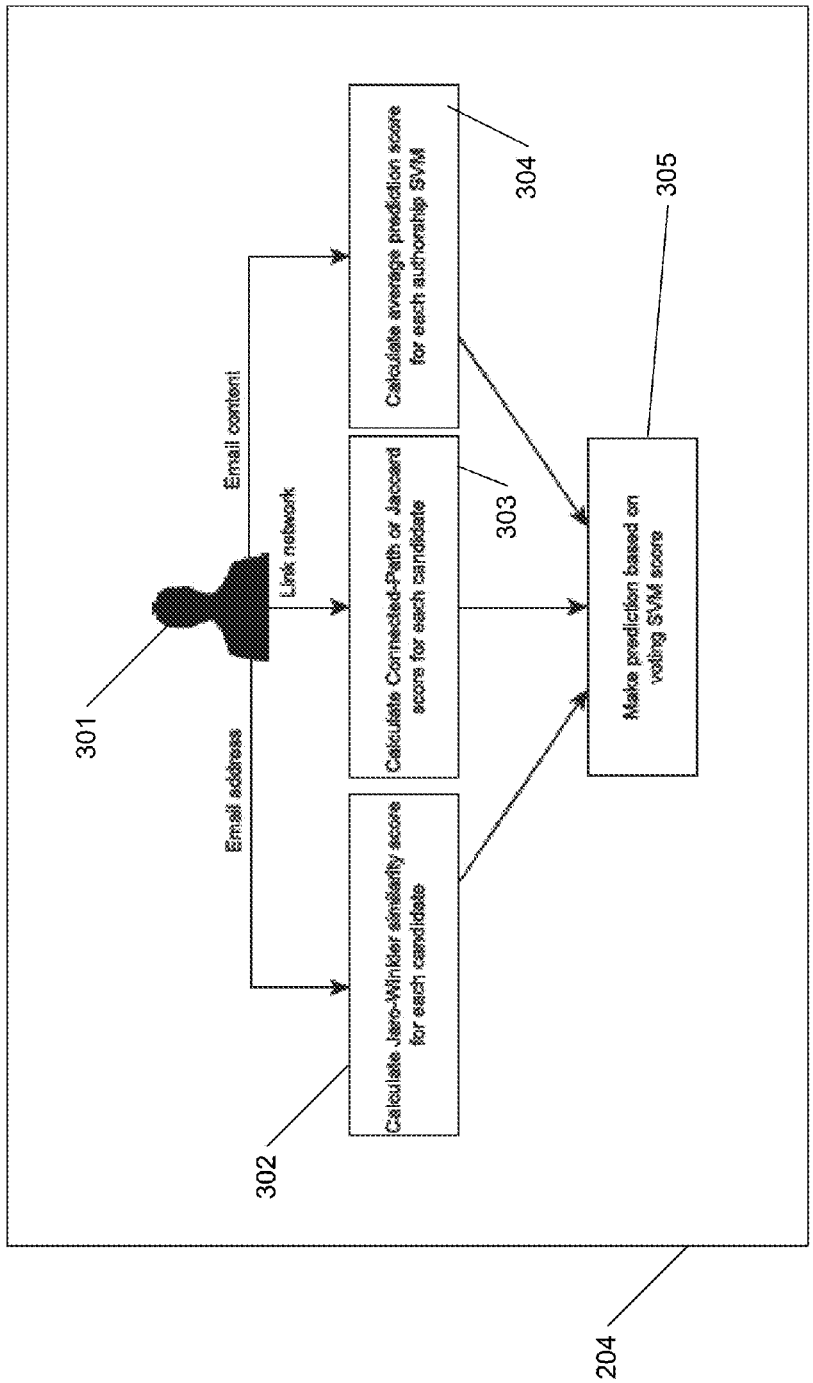
FIG. 3 illustrates an exemplary process of three (3) individual name and alias resolution processes and of a combined voting process to disambiguate and normalize names and aliases.

FIG. 3 illustrates an exemplary process of three (3) individual name and alias resolution processes and of a combined voting process to disambiguate and normalize names and aliases. In FIG. 3, to determine the name of the author 301 of a document or to determine the actual reference of a name in the document, the three approaches are used in step 204 to normalize the name and to resolve the name reference or alias. In step 302, a Jaro-Winkler similarity score is calculated between each name, reference or alias occurrence and each candidate known by the system. In step 303, the Jaccard score for the connected path is calculated for each name, reference or alias occurrence and each candidate known by the system. In step 304, an average prediction score of the authorship SVM by using information from the document in which the name or references occur, for each candidate known by the system. Optionally, step 305 can combine the output from steps 302, 303 and 304 using a suitable voting algorithm, and the like, and can be employed, for example, if steps 302, 303 and 304 have different values for name, reference and alias occurrences.

FIG. 4 illustrates an exemplary mathematical description of a Jaro-Winkler method. In FIG. 4, the Jaro distance is calculated as illustrated in formula 401. Then, the Jaro-Winkler distance is calculated as illustrated in formula 402.

Figure 5:
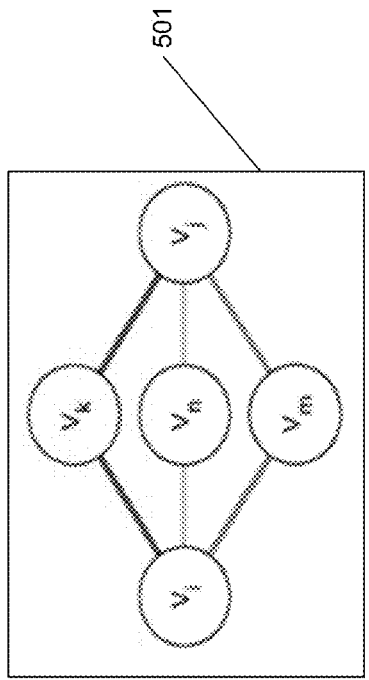
FIG. 5 illustrates an exemplary mathematical description of a Jaccard similarity method.

FIG. 5 illustrates an exemplary mathematical description of a Jaccard similarity method. In FIG. 5, for a given network 501, the Jaccard similarity can be calculated as illustrated in formula 502.

FIG. 6 illustrates an exemplary table with extracted syntactic, semantic and structural features of a text of a document for an authorship support vector machine (SVM). In FIG. 6, a table 601 shows the extracted syntactic, semantic and structural features of the text of a document for the authorship support vector machine (SVM). All or some of the features shown are used in the Authorship Support Vector Machine (SVM) to derive characteristics for each candidate author. Such structural, syntactical and semantic characteristics, are converted into mathematical feature vectors and used for the machine learning process to create one unique classifier per known candidate.

FIG. 7 illustrates an exemplary table of function words used in an authorship support vector machine (SVM). In FIG. 7, a table 701 provides a list of function words used in one of the features of the Authorship Support Vector Machine (SVM).

Figure 8:
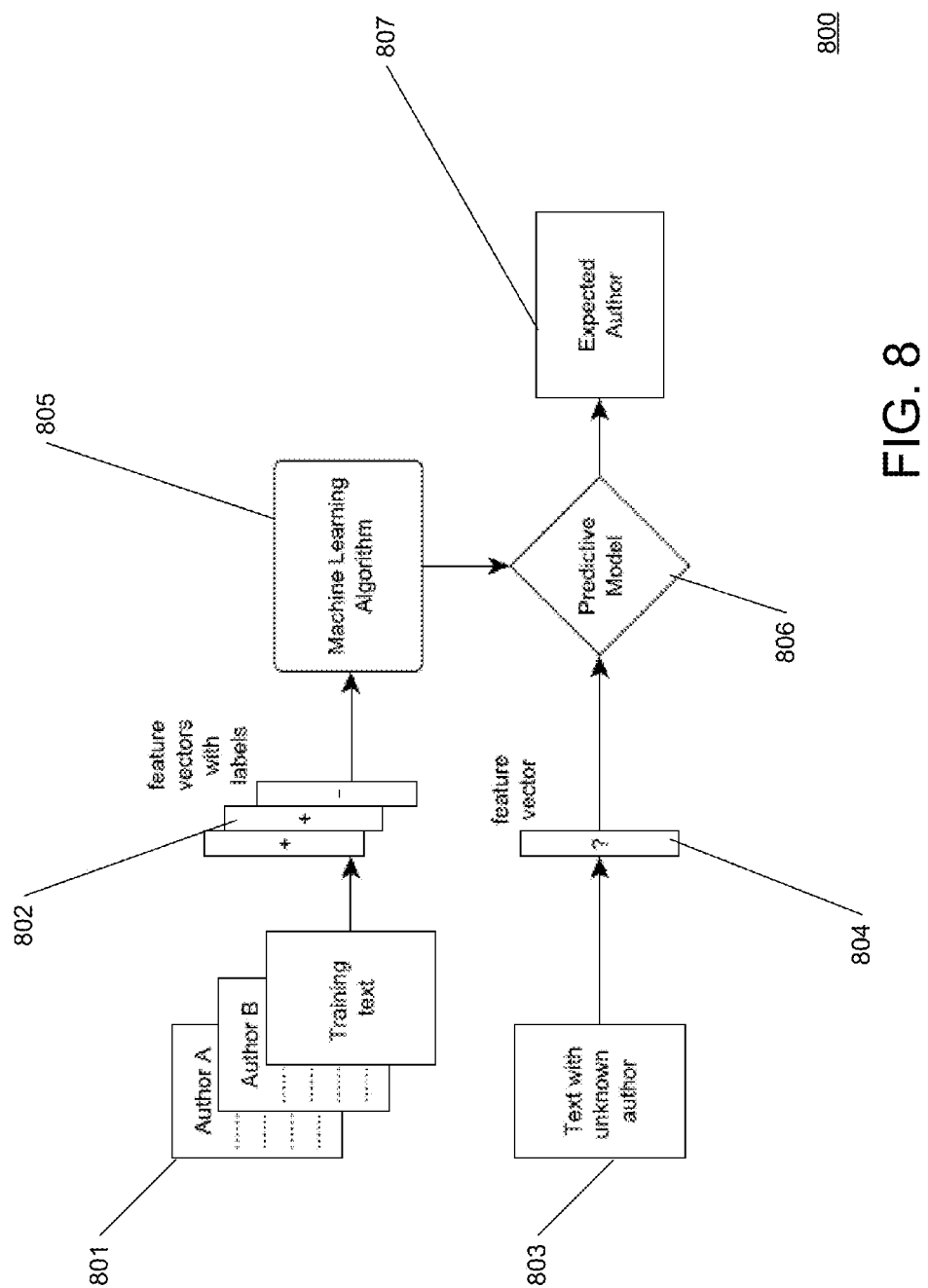
FIG. 8 illustrates an exemplary system and process of training, testing and employing a machine learning model from an authorship support vector machine (SVM) to recognize authors based on extracted features from documents.

FIG. 8 illustrates an exemplary system and process of training, testing and employing a machine learning model from an authorship support vector machine (SVM) to recognize authors based on extracted features from documents. In FIG. 8, for each document 801, a set of characteristics is derived, from which feature vectors 802 are derived. The feature vectors 802 are used to train one machine learning model for each known candidate author by using a machine learning algorithm 805, for example, a Support Vector Machine (SVM). After testing and evaluating the quality of the machine learning model, as further explained, the derived machine learning model can be used to classify documents from a text 803 with an unknown author by deriving characteristics from the document and converting them into a feature vector 804 in a similar manner as employed during the training of the machine learning model. The feature vector 804 is then matched against each machine learning model derived for each of the candidate authors, and a prediction as to whether or not the document has been written by the author corresponding to the machine learning model is made in step 806. Step 806 returns a confidence value, for example, indicating 0 for no match, 1 for a perfect match, and any suitable value in between indicating the probability for a match. By using a suitable threshold, potential candidate authors can be determined in order of decreasing probability, and can be presented as a ranked list for each of the documents in step 807.

Figure 9:
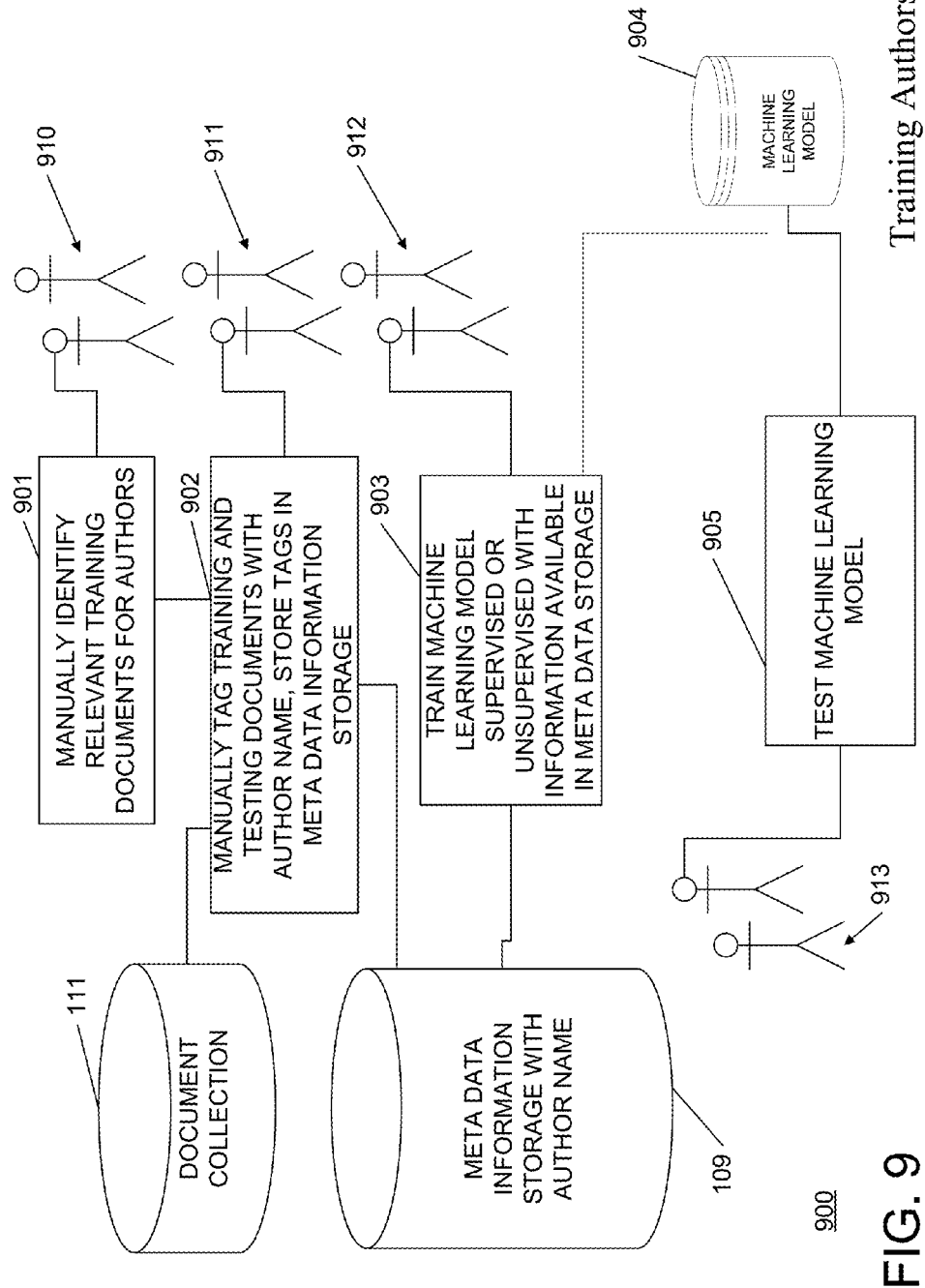
FIG. 9 illustrates an exemplary detailed process of training and testing of an authorship support vector machine (SVM)

FIG. 9 illustrates an exemplary detailed process of training and testing of an authorship support vector machine (SVM). At step 901, a user or a group of users 910 manually or automatically identify a set of relevant training and testing documents from the document collection 111. The set of training documents need not have any documents in common with the set of testing documents, such that the sets are mutually exclusive. Selection of relevant training material can also be performed using clustering or concept search techniques that cluster similar documents for certain document categories by using, for example, self-organization or vector decomposition techniques (e.g., Hierarchical Clustering algorithms, Kohonen Self-Organizing maps, linear discriminant analysis (LDA), etc.).

At step 902, a user or a group of users 911 manually or automatically tag the selected training and testing documents from document collection 111 with the corresponding document categories, in this case the authors. At step 903, the machine learning model 904 is trained by using a vector representation created from the records with the extracted information for each document in the meta information storage device 109 together with the document categorization label which exists for each document from the training set in the document collection database 111. Both supervised as unsupervised machine learning algorithms can be used, including, for example, Support Vector Machines (SVM), k-Nearest Neighbor (kNN), naïve Bayes, Decision Rules, k-means, Hierarchical Clustering, Kohonen self-organizing feature maps, linear discriminant analysis (LDA), and the like.

At step 905, the machine learning model 904 is tested by comparing recognized categories with pre-labeled authors from documents in the test documents in document database 111. Such testing is done by a user or a user group 913. Results of step 905 can be reported, for example, in terms of precision, recall, f-values, and the like, and other best practice measurements from the fields of information retrieval, and the like.

Figure 10:
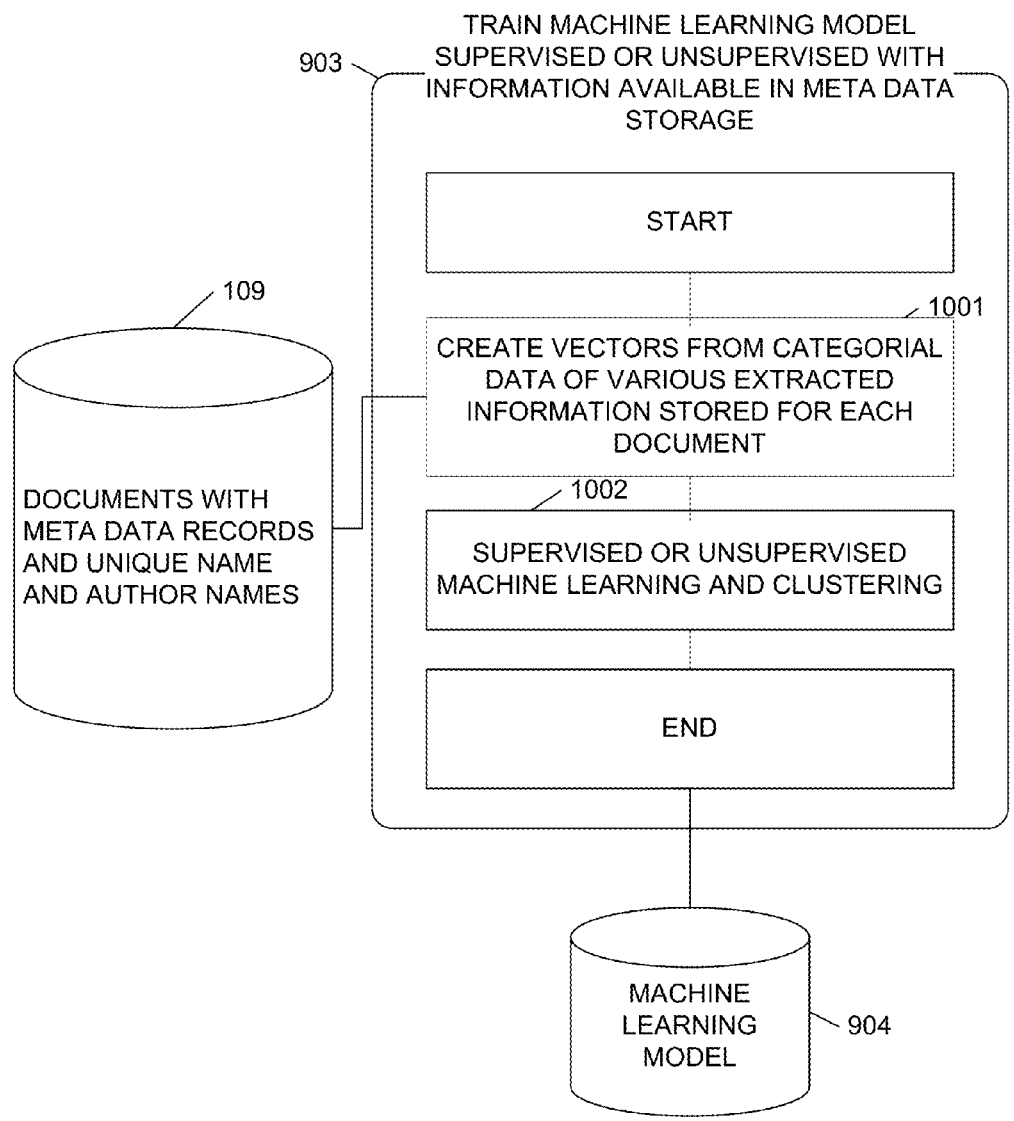
FIG. 10 illustrates an exemplary detailed process of training of a machine learning model of an authorship support vector machine (SVM)

FIG. 10 illustrates an exemplary detailed process of training of a machine learning model of an authorship support vector machine (SVM). In FIG. 10, step 903 of FIG. 9 is explained in more detail. In order to train the machine learning model either in a supervised or unsupervised manner to predict the category of a document from the extracted meta data information, mathematical vectors are created from the categorical data in step 1001. Next, the vectors are used as feature vectors for any known supervised or unsupervised clustering and machine learning technique, for example, such as Decision Trees, Support Vector Machines (SVM), Naïve-Bayes Classifiers, k-Nearest Neighbors, rules-based classification, Scatter-Gather Clustering, Latent Discriminant Analysis (LDA), or Hierarchical Agglomerate Clustering, (HAC), and the like. At the end of such a process, a machine learning model 904 is generated that can be used for automatic document classification. The machine learning model can be a binary classifier, with one trained classifier per category or a multi-class classifier trained to recognize multiple classes with one classifier.

Figure 11:
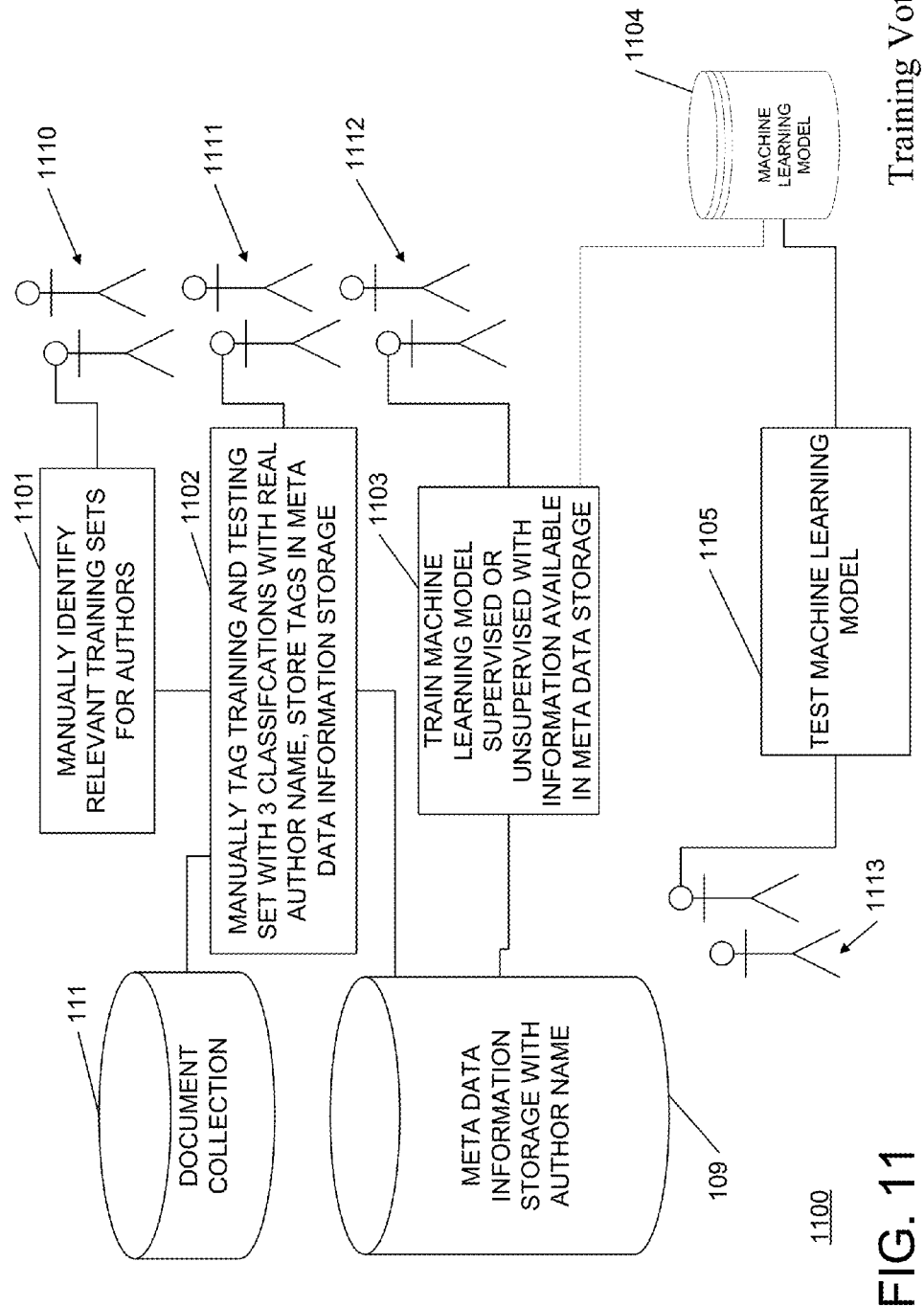
FIG. 11 illustrates an exemplary detailed process of training and testing of a voting support vector machine (SVM), which combines an output for three (3) classifiers.

FIG. 11 illustrates an exemplary detailed process of training and testing of a voting support vector machine (SVM), which combines an output for three above-described classifiers. In FIG. 11, the training and testing of the voting support vector machine (SVM) 900 of FIG. 9 can be used to optionally combine the output from the name and alias normalization and disambiguation resolution systems and processes 302, 303 and 304 of FIG. 3. At step 1101, a user or a group of users 1110 manually or automatically identify a set of relevant training and testing documents and classifications from name and alias normalization and disambiguation resolution systems and processes 302, 303 and 304 for documents in the document collection 111. The training set need not have any document in common with the testing set, such that sets are mutually exclusive. Selection of relevant training material can also be done by using clustering or concept search techniques that cluster similar documents for certain document categories, for example, self-organization or vector decomposition techniques (e.g., for instance Hierarchical Clustering algorithms, Kohonen Self-Organizing maps, linear discriminant analysis (LDA), etc.). At step 1102, a user or a group of users 1111 manually or automatically tag the selected training and testing documents from the document collection 111 with the corresponding document categories, results from name and alias normalization and disambiguation resolution systems or processes 302, 303 and 304, and in this case the name of the actual authors. At step 1103, the machine learning model 1104 is trained by using a vector representation created from the records with the extracted information for each document in the meta information storage device 109 together with the document categorization label, which exists for each document from the training set in the document collection database 111. Both supervised and unsupervised machine learning algorithms can be used, such as Support Vector Machines (SVM), k-Nearest Neighbor (kNN), naïve Bayes, Decision Rules, k-means, Hierarchical Clustering, Kohonen self-organizing feature maps, linear discriminant analysis (LDA), and the like. At step 1105, the machine learning model 1104 is tested by comparing recognized categories with the pre-labeled authors from documents in the test documents in the document database 111. Such testing is done by a user or a user group 1113 and the results of step 1105 can be reported in terms of precision, recall, f-values, and the like, and other best practice measurements from the fields of information retrieval, and the like.

Figure 12:
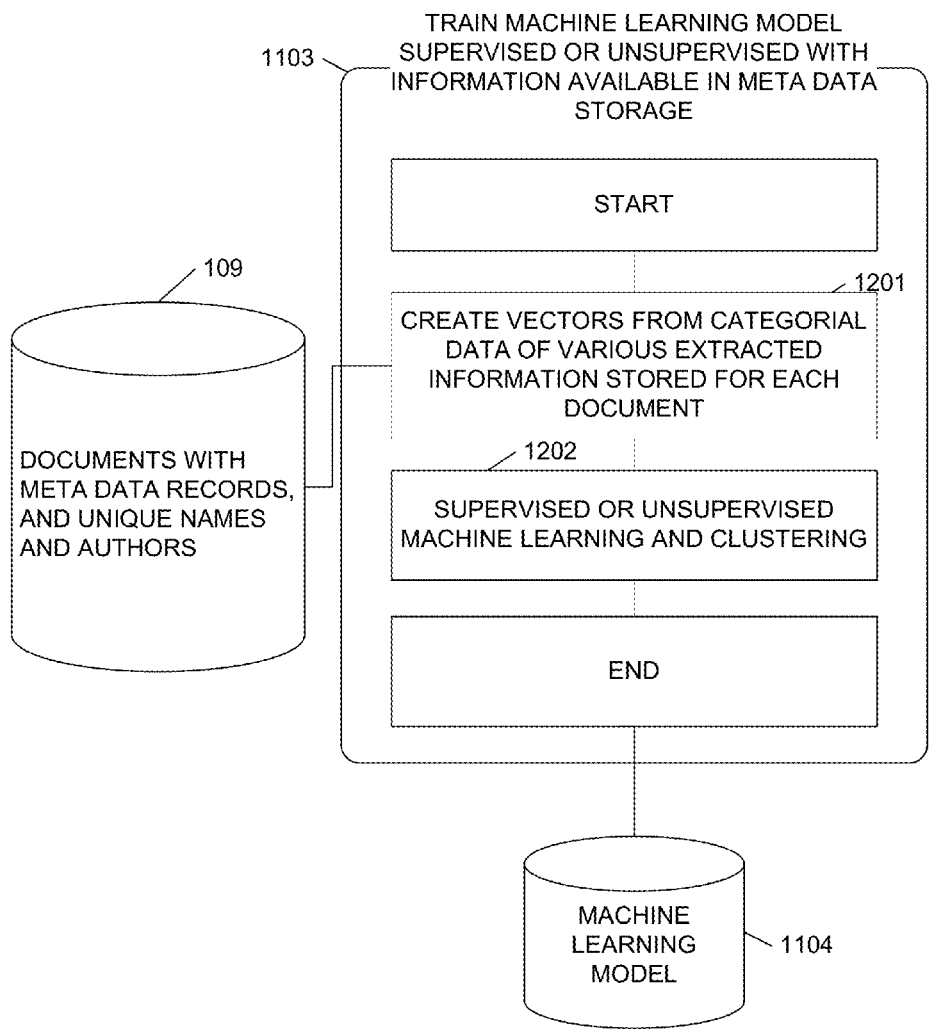
FIG. 12 illustrates an exemplary detailed process of training of a voting support vector machine (SVM), which combines the output for three (3) classifiers.

FIG. 12 illustrates an exemplary detailed process of training of a voting support vector machine (SVM), which combines the output for three above-described classifiers. In FIG. 12, step 1103 of FIG. 11 is explained in more detail. The exemplary process can be used to train a machine learning model with a supervised or unsupervised machine learning algorithm 1200. In order to train the machine learning model either in a supervised or on-supervised manner to predict the category of a document from the extracted meta data information, mathematical vectors are created from the categorical data in step 1201. Next, such vectors are used as feature vectors for any known supervised or unsupervised clustering and machine learning technique, including Decision Trees, Support Vector Machines (SVM), Naïve-Bayes Classifiers, k-Nearest Neighbors, rules-based classification, Scatter-Gather Clustering, Latent Discriminant Analysis (LDA), or Hierarchical Agglomerate Clustering, (HAC), and the like. At the end of such a process, a machine learning model 1104 is generated that can be used for automatic document classification. The machine learning model can be a binary classifier, with one trained classifier per category or a multi-class classifier trained to recognize multiple classes with one classifier.

Figure 13:
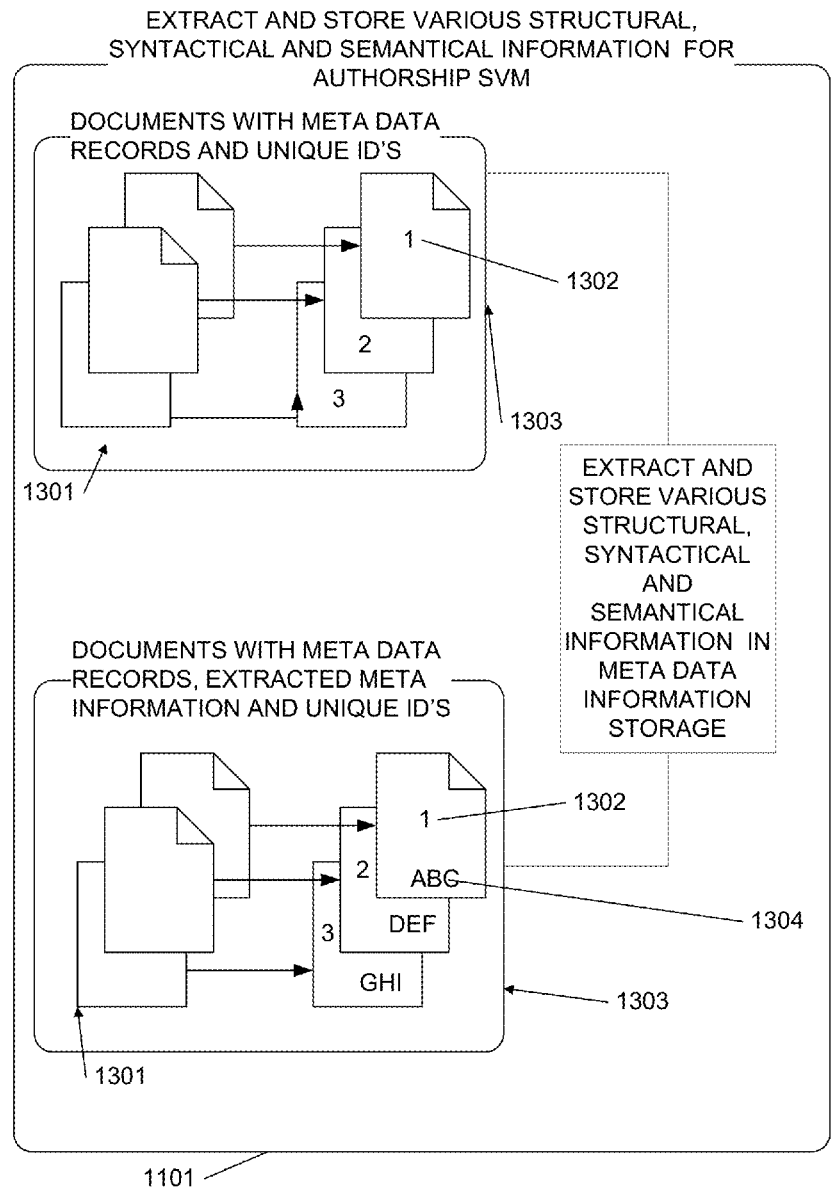
FIG. 13 illustrates an exemplary detailed process of extracting and storing various structural, syntactical, and semantic information from documents used by an authorship support vector machine (SVM)

FIG. 13 illustrates an exemplary detailed process of extracting and storing various structural, syntactical, and semantic information from documents used by an authorship support vector machine (SVM). In FIG. 13, step 802 of FIG. 8 is described in more detail, and in particular, as to how the extracted various structural, syntactical and semantic information is stored in the meta information data storage device 109. For each document 1301, the additional structural, syntactical and semantic information 1304 is stored in each unique record 1302 linked to a document.

Figure 14:
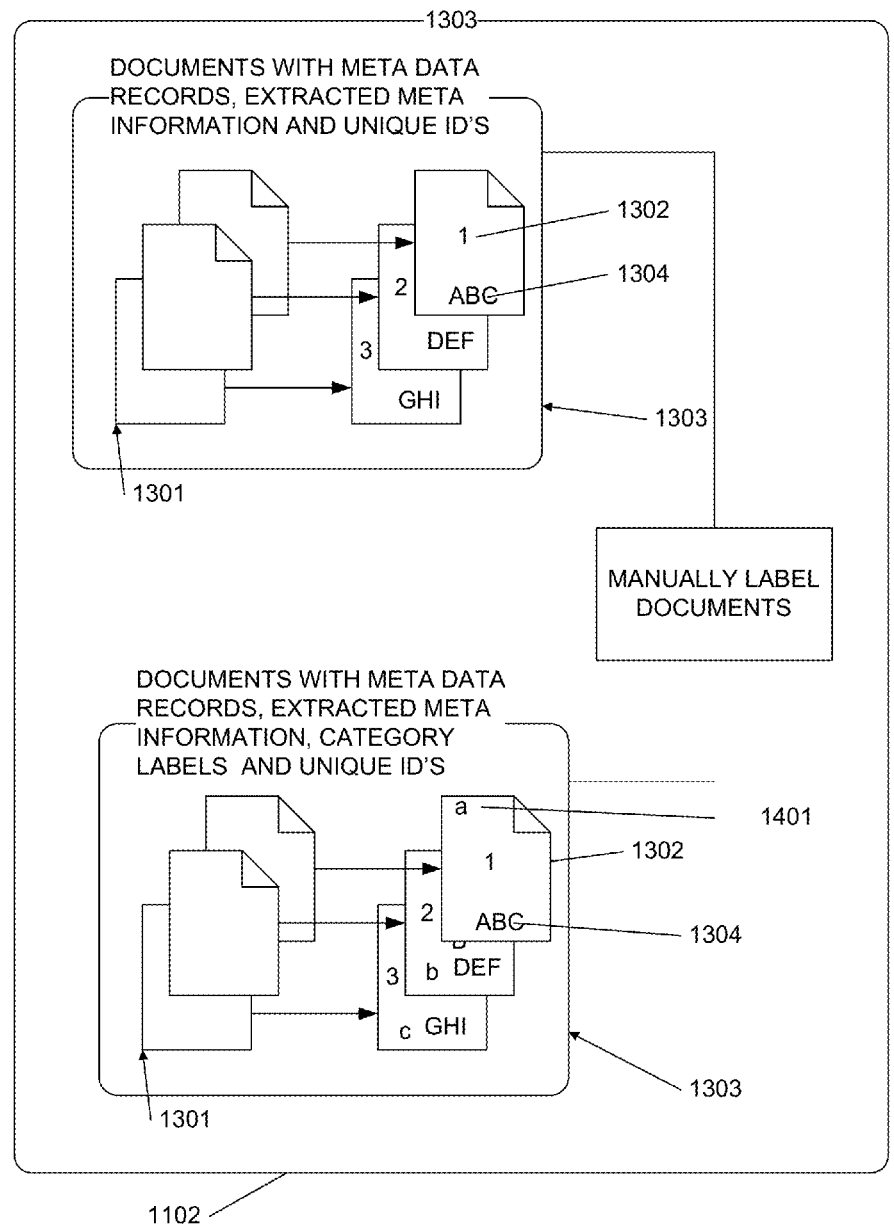
FIG. 14 illustrates an exemplary detailed process of manually or automatically labeling of test sets from both an authorship support vector machine (SVM) and a voting support vector machine (SVM) employed for training and testing of a machine learning process.

FIG. 14 illustrates an exemplary detailed process of manually or automatically labeling of test sets from both an authorship support vector machine (SVM) and a voting support vector machine (SVM) employed for training and testing of a machine learning process. In FIG. 14, step 902 of FIG. 9 and step 1102 of FIG. 11 are described in more detail. For each author, a relevant set of training and testing documents is selected by a user of a group of users using manual and automatic techniques, such as intuition, statistics, cross validation, maximum likelihood estimation, clustering, self-organization, feature extraction and feature selection methods, and the like. Each document 1301 is then labeled manually or automatically with the class or classes 1401 it belongs to. Such additional information is stored in the unique record 1302 that exists for each document 1301 in sub-process 1303.

Figure 15:
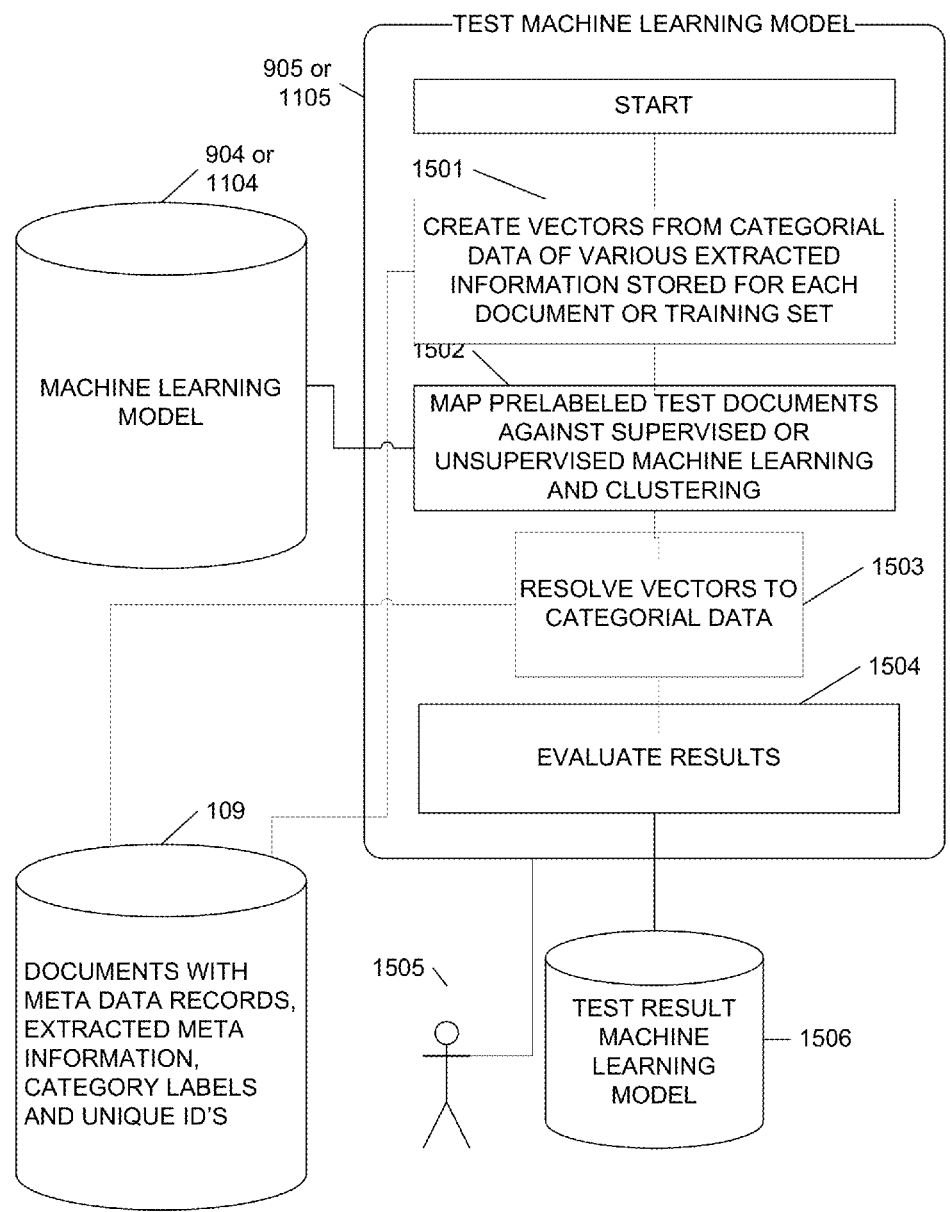
FIG. 15 illustrates an exemplary detailed process of testing of both an authorship support vector machine (SVM) and a voting support vector machine (SVM), wherein principle and structure of such different processes can be identical so as to be represented in a single drawing.

FIG. 15 illustrates an exemplary detailed process of testing of both an authorship support vector machine (SVM) and a voting support vector machine (SVM), wherein principle and structure of such different processes can be identical so as to be represented in a single drawing. In FIG. 15, the exemplary process to test a machine learning model can be for a supervised or unsupervised machine learning algorithm. FIG. 15 specifies step 905 of FIG. 9 and step 1105 of FIG. 11 for testing the machine learning model in more detail. Although these can be completely different processes working on different data, they share similar principles and process structure, and are described herein to avoid redundancy and confusion. For each document in the test set, in step 1501, a feature vector is created from the extracted structural, syntactical and semantic information that is stored meta data records 109 for each test document. In step 1502, such a vector is then mapped against the machine learning model 904 or 1104 and the machine learning model 904 or 1104 returns a recognized author.

When binary classifiers are used, the vector of the test document is compared to each classifier and a value representing the measure of recognition is returned. By using, for example, a user definable threshold, and the like, the test document can be included or excluded for one or more classes. The recognized classes are returned as one or more return values in a predefined range, where higher values represent a match and lower values represent a miss-match with each category. In the case of a multi-class classifier, the values of the classes that are a best match for the vector of the test document are returned. In both cases, the name of the class(es) of the highest values returned can be resolved by using information in 109 to a categorical value in step 1503.

Next, the recognized document class is compared to the pre-labeled document category in step 1504. A user or a group of users 1105 can then compare the results and obtain an overall set of test results representing the quality of the machine learning model in 1506. Test results can for instance be expressed in terms of precision and recall and in a combination of precision and recall, the so-called f-values of 11 points precision based on an arithmetic average.

Figure 16:
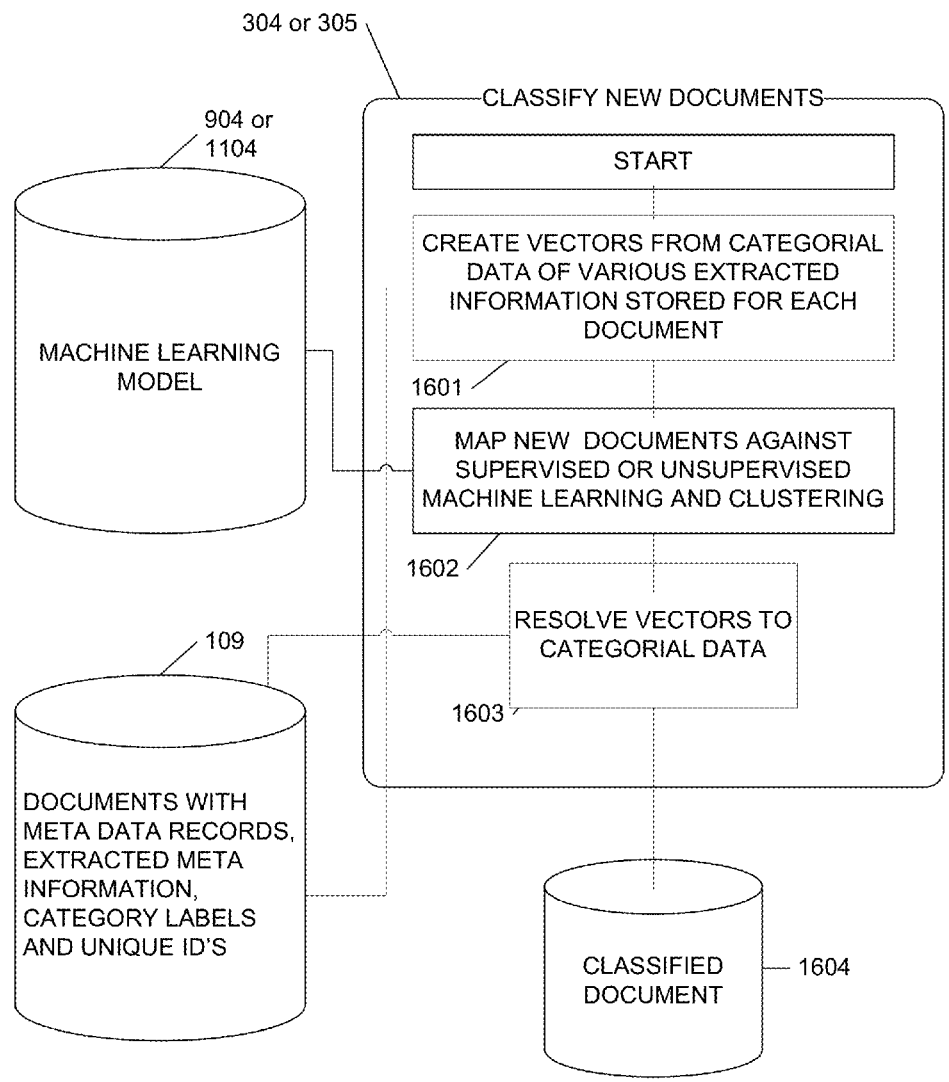
FIG. 16 illustrates an exemplary detailed process of classifying names and aliases by using both an authorship support vector machine (SVM) and a voting support vector machine (SVM), wherein principle and structure of such different processes can be identical so as to be represented in a single drawing.

FIG. 16 illustrates an exemplary detailed process of classifying names and aliases by using both an authorship support vector machine (SVM) and a voting support vector machine (SVM), wherein principle and structure of such different processes can be identical so as to be represented in a single drawing. In FIG. 1600, step 304 and 305 of FIG. 3 are explained in more detail. Although these are completely different processes working on different data, they do have exactly the same principles and process structure. For that reason they are discussed here in one drawing to avoid redundancy and confusion. For each document in the test set, a feature vector is created from the extracted structural, syntactical and semantic information that is stored meta data records 109 for each test document in step 1601. In step 1602, this vector is then mapped against the machine learning model 904 or 1104 and the machine learning model 904 or 1104 returns a recognized document class, in this case the name of the candidate author.

When binary classifiers are used, the vector of the test document is compared to each classifier and a value representing the measure of recognition is returned. By using a (user definable threshold), the test document can be included or excluded for one or more classes. The recognized classes are returned as one or more return values in a predefined range where higher values represent a match and lower values represent a miss-match with each category. In the case of a multi-class classifier, the values of the classes which are a best match for the vector of the test document are returned. In both cases, the name of the class(es) of the highest values returned, needs to be resolved by using information in the document meta data information storage devices 109 to a categorical value in step 1603. The system then return the recognized document class(es) in step 1604.

Figure 17:
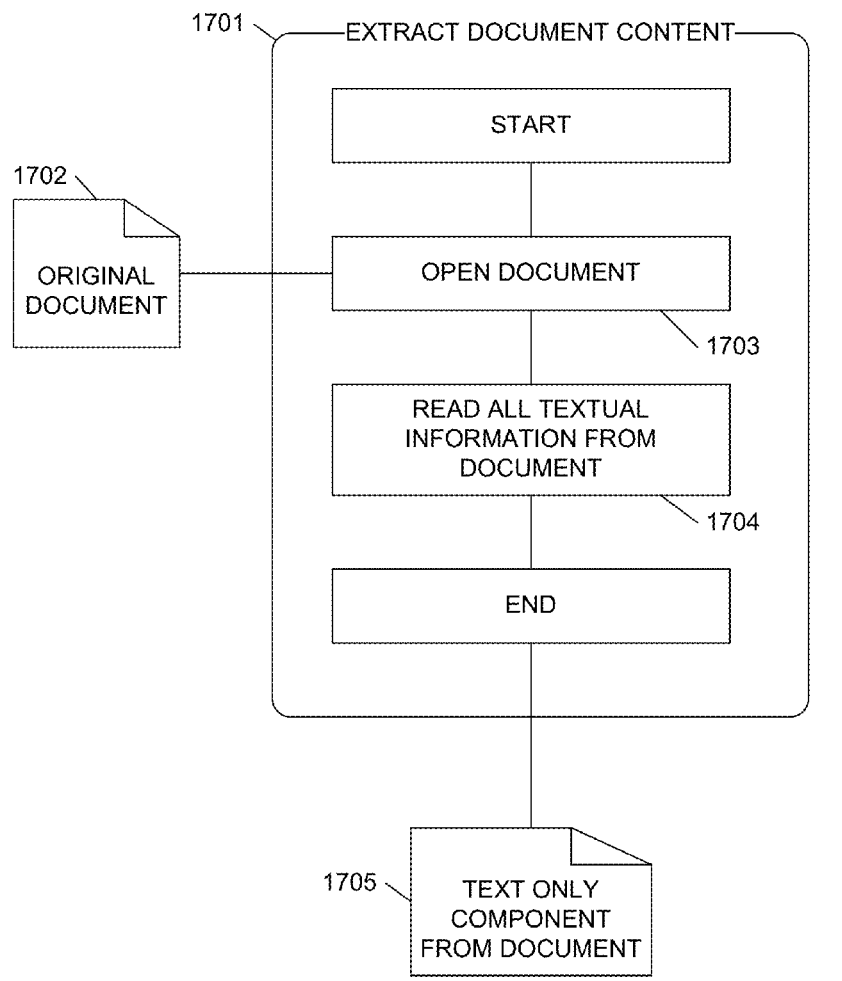
FIG. 17 illustrates an exemplary detailed process of extracting textual content from documents.

FIG. 17 illustrates an exemplary detailed process of extracting textual content from documents. In FIG. 17, when the content of a document is extracted, the document is first opened in step 1703 and all suitable textual content is extracted from the document in step 1704, including next to all suitable visible text and document layout, any suitable type of non-visible textual information, such as file security, document properties, project properties, user information, file system and storage properties, and any other suitable type of hidden or meta data information, and the like. In this process, low-level document encoding (e.g., UNICODE, Windows code pages, ASCII, ANSI, etc.) are resolved and normalized to one common text representation (e.g., 16 bits UNICODE), and the sequence of the words (e.g., left-right for Roman, right-left for Arabic, and top-down for Asian languages), and layout sequence is normalized. The result is a uniform textual representation of all suitable textual content of a document in step 1705.

Figure 18:
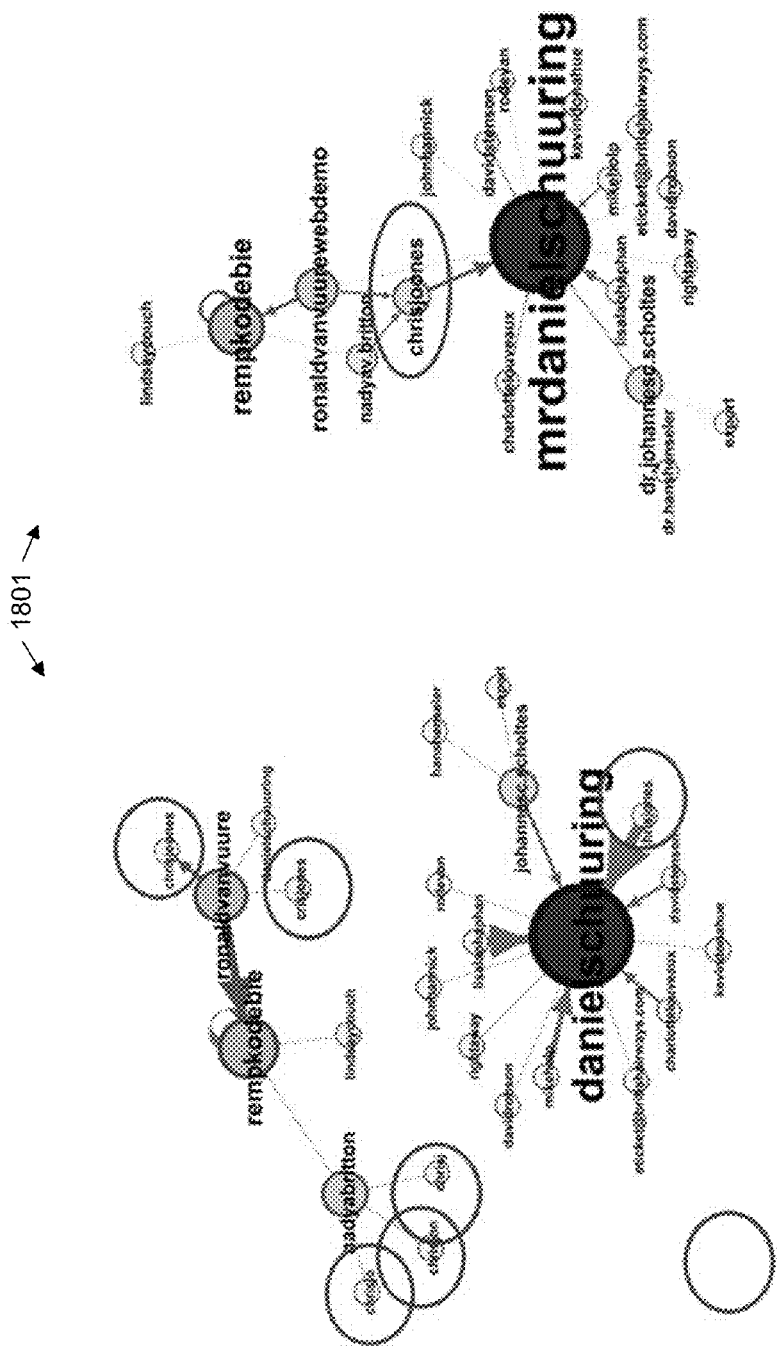
FIG. 18 illustrates an exemplary detailed example of effects of name normalization and alias resolution for network analysis.

FIG. 18 illustrates an exemplary detailed example of effects of name normalization and alias resolution for network analysis. In FIG. 18, in the left side of the graph, two disconnected networks can be seen above each other. The disconnection is because the name of Chris Jones is written in several formats: crisjones, chrisjo, chrisj, chrisjon, chrisjoones, and chrisjones. Although this example is artificial, the presented spelling variations and errors are very typical and commonly found. In the right side of the graphs, one can see that the networks actually connect after all the suitable name occurrences of the name Chris Jones are properly disambiguated, normalized or resolved. By using name and alias normalization and resolution, not only is the number of unique items largely reduced (e.g., reducing the mathematical complexity of the analysis and the visualization significantly), but also a relation between two sets of people can be found, and typically which would never have been found without the above-described normalization and disambiguation process.

The above-described devices and subsystems of the illustrative embodiments can include, for example, any suitable servers, workstations, PCs, laptop computers, PDAs, Internet appliances, handheld devices, cellular telephones, smart phones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A computer implemented system for authorship determination, and alias resolution, the system comprising:
    a processor and a memory executing:
    a document collection;
    a Jaro-Winkler similarity module configured for performing authorship determination and alias resolution based on at least one of email addresses, user identification numbers (IDs) on social networks, names written in text, and proper names, including countries and cities in the document collection;
    an authorship Support Vector Machine (SVM) module configured for performing authorship determination and alias resolution based on content of documents in the document collection, including at least one of emails, and social networks information;
    a Jaccard similarity module configured for performing authorship determination and alias resolution based on link networks in the document collection,
    wherein the system is configured to employ the Jaro-Winkler similarity module, the authorship Support Vector Machine (SVM) module, and the Jaccard similarity module for performing the authorship determination and the alias resolution in the document collection; and
    a voting Support Vector Machine (SVM) module configured to combine outputs from the Jaro-Winkler similarity module, the authorship Support Vector Machine (SVM) module, and the Jaccard similarity module using a voting algorithm,
    wherein the system is configured to extract syntactic, structural, and semantic features for the authorship determination and the alias resolution in the document collection.

2. A computer implemented method for authorship determination, and alias resolution in a document collection, the method comprising:
    providing a processor and a memory executing the steps of:
    performing with a Jaro-Winkler similarity module authorship determination and alias resolution based on at least one of email addresses, user identification numbers (IDs) on social networks, names written in text, and proper names, including countries and cities in a document collection;
    performing with an authorship Support Vector Machine (SVM) module authorship determination and alias resolution based on content of documents in the document collection, including at least one of emails, and social networks information;
    performing with a Jaccard similarity module authorship determination and alias resolution based on link networks in the document collection;

employing the Jaro-Winkler similarity module, the authorship Support Vector Machine (SVM) module, and the Jaccard similarity module for performing the authorship determination and the alias resolution in the document collection;

combining with a voting Support Vector Machine (SVM) module outputs from the Jaro-Winkler similarity module, the authorship Support Vector Machine (SVM) module, and the Jaccard similarity module using a voting algorithm; and extracting syntactic, structural, and semantic features for the authorship determination and the alias resolution in the document collection.

3. A computer program product for authorship determination, and alias resolution in a document collection and including one or more computer readable instructions embedded on a tangible, non-transitory computer readable medium and configured to cause one or more computer processors to perform the steps of:

providing a processor and a memory executing the steps of:

performing with a Jaro-Winkler similarity module authorship determination and alias resolution based on at least one of email addresses, user identification numbers (IDs) on social networks, names written in text, and proper names, including countries and cities in a document collection;

performing with an authorship Support Vector Machine (SVM) module authorship determination and alias resolution based on content of documents in the document collection, including at least one of emails, and social networks information;

performing with a Jaccard similarity module authorship determination and alias resolution based on link networks in the document collection;

employing the Jaro-Winkler similarity module, the authorship Support Vector Machine (SVM) module, and the Jaccard similarity module for performing the authorship determination and the alias resolution in the document collection;

combining with a voting Support Vector Machine (SVM) module outputs the Jaro-Winkler similarity module, the authorship Support Vector Machine (SVM) module, and the Jaccard similarity module using a voting algorithm; and extracting syntactic, structural, and semantic features for the authorship determination and the alias.

* * * * *